US007739599B2

(12) United States Patent
Patten et al.

(10) Patent No.: US 7,739,599 B2
(45) Date of Patent: Jun. 15, 2010

(54) AUTOMATIC CAPTURING AND EDITING OF A VIDEO

(75) Inventors: Michael J. Patten, Sammamish, WA (US); Bret D. Ahlstrom, Woodinville, WA (US); Ian Mercer, Sammamish, WA (US); Russell Scott Randall, Seattle, WA (US); Warren L. Burch, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 841 days.

(21) Appl. No.: 11/234,489

(22) Filed: Sep. 23, 2005

(65) Prior Publication Data
US 2007/0074115 A1    Mar. 29, 2007

(51) Int. Cl.
*G06F 3/00* (2006.01)
*G06F 3/048* (2006.01)
(52) U.S. Cl. .................. 715/723; 715/719; 715/716
(58) Field of Classification Search .................. 715/726, 715/723, 716, 719, 730, 781
See application file for complete search history.

(56) References Cited

U.S. PATENT DOCUMENTS

| | | | |
|---|---|---|---|
| 5,353,391 A | 10/1994 | Cohen et al. | |
| 5,513,306 A | 4/1996 | Mills et al. | |
| 5,559,641 A | 9/1996 | Kajimoto et al. | |
| 5,706,417 A | 1/1998 | Adelson | |
| 5,929,867 A | 7/1999 | Herbstman et al. | |
| 6,028,603 A | 2/2000 | Wang et al. | |
| 6,081,299 A | 6/2000 | Kesselring | |
| 6,173,317 B1 | 1/2001 | Chaddha et al. | |
| 6,195,088 B1 | 2/2001 | Signes | |
| 6,204,840 B1 | 3/2001 | Petelycky et al. | |
| 6,230,172 B1 | 5/2001 | Purnaveja et al. | |
| 6,269,394 B1 | 7/2001 | Kenner et al. | |
| 6,317,795 B1 | 11/2001 | Malkin et al. | |
| 6,351,765 B1 | 2/2002 | Pietropaolo et al. | |
| 6,369,835 B1 | 4/2002 | Lin | |
| 6,373,507 B1 | 4/2002 | Camara et al. | |
| 6,424,789 B1 * | 7/2002 | Abdel-Mottaleb | ........... 386/52 |

(Continued)

FOREIGN PATENT DOCUMENTS

JP        05290548        11/1993

(Continued)

OTHER PUBLICATIONS

AverMedia, "Ultramedia USB 300," http://www.aver.com/products/tvtuner_UltraTV_USB_300.shtml, printed Sep. 22, 2005, 3 pages.

(Continued)

*Primary Examiner*—Dennis-Doon Chow
*Assistant Examiner*—Rashawn Tillery
(74) *Attorney, Agent, or Firm*—Senniger Powers LLP

(57) ABSTRACT

Automatic editing of video clips detected during the capture of a video data stream. A media editing application identifies video clips as a function of determined property values of each of a series of video frames included in the video. An edit component automatically edits video clips during the capture of the video data stream. A user interface allows the user to view individual video clips during the video capturing process and to define desired transition effects to apply between successive video clips and/or a desired special effect to apply to selected video clips.

17 Claims, 11 Drawing Sheets

U.S. PATENT DOCUMENTS

| | | | |
|---|---|---|---|
| 6,469,711 B2 | 10/2002 | Foreman et al. | |
| 6,597,859 B1 | 7/2003 | Leinhart et al. | |
| 6,628,710 B1 | 9/2003 | Llach-Pinsach et al. | |
| 6,721,361 B1 | 4/2004 | Covell et al. | |
| 6,807,306 B1 | 10/2004 | Girgensohn et al. | |
| 6,813,313 B2 | 11/2004 | Xu et al. | |
| 6,877,134 B1 | 4/2005 | Fuller et al. | |
| 6,882,793 B1* | 4/2005 | Fu et al. | 386/95 |
| 6,928,613 B1 | 8/2005 | Ishii et al. | |
| 7,016,540 B1 | 3/2006 | Gong et al. | |
| 7,027,509 B2 | 4/2006 | Jun et al. | |
| 7,042,464 B1* | 5/2006 | Paquette | 345/601 |
| 7,124,366 B2 | 10/2006 | Foreman et al. | |
| 7,203,380 B2 | 4/2007 | Chiu et al. | |
| 7,222,300 B2 | 5/2007 | Toyama et al. | |
| 7,334,191 B1* | 2/2008 | Sivan et al. | 715/723 |
| 7,398,004 B1 | 7/2008 | Maffezzoni et al. | |
| 7,444,062 B2 | 10/2008 | Matsumoto | |
| 2001/0035875 A1 | 11/2001 | Suzuki et al. | |
| 2001/0041020 A1 | 11/2001 | Shaffer et al. | |
| 2002/0138619 A1 | 9/2002 | Ramaley et al. | |
| 2002/0188943 A1 | 12/2002 | Freeman et al. | |
| 2003/0052909 A1* | 3/2003 | Mo et al. | 345/716 |
| 2003/0090506 A1 | 5/2003 | Moore et al. | |
| 2003/0146915 A1 | 8/2003 | Brook et al. | |
| 2003/0192049 A1 | 10/2003 | Schneider et al. | |
| 2003/0227493 A1 | 12/2003 | Yokomizo | |
| 2003/0234805 A1* | 12/2003 | Toyama et al. | 345/723 |
| 2003/0237091 A1 | 12/2003 | Toyama et al. | |
| 2004/0049419 A1 | 3/2004 | Knight | |
| 2004/0131330 A1 | 7/2004 | Wilkins et al. | |
| 2004/0131332 A1 | 7/2004 | Wilson et al. | |
| 2004/0143846 A1 | 7/2004 | Zeps et al. | |
| 2004/0230655 A1 | 11/2004 | Li et al. | |
| 2005/0005308 A1 | 1/2005 | Logan et al. | |
| 2005/0053352 A1 | 3/2005 | McKain et al. | |
| 2005/0053356 A1* | 3/2005 | Mate et al. | 386/52 |
| 2005/0071774 A1 | 3/2005 | Lipsky et al. | |
| 2005/0081159 A1 | 4/2005 | Gupta et al. | |
| 2005/0097477 A1 | 5/2005 | Camara et al. | |
| 2005/0246373 A1 | 11/2005 | Faulkner et al. | |
| 2005/0249080 A1 | 11/2005 | Foote et al. | |
| 2005/0257151 A1* | 11/2005 | Wu | 715/716 |
| 2005/0281535 A1 | 12/2005 | Fu et al. | |
| 2005/0286863 A1 | 12/2005 | Howarth | |
| 2006/0059426 A1 | 3/2006 | Ogikubo | |
| 2006/0288288 A1* | 12/2006 | Girgensohn et al. | 715/716 |
| 2007/0074115 A1 | 3/2007 | Patten et al. | |
| 2007/0218448 A1 | 9/2007 | Harmeyer et al. | |
| 2008/0034325 A1 | 2/2008 | Ording | |

FOREIGN PATENT DOCUMENTS

| | | |
|---|---|---|
| WO | WO 9226600 | 8/1996 |
| WO | WO 0146955 | 6/2001 |

OTHER PUBLICATIONS

Muvee Technologies, Muvee autoProducer 4, http://muvee.com/website/ap4.php, printed Sep. 22, 2005, 2 pages.

DeskShare, Video Edit Magic v4.11, http://www.deskshare.com/vem.aspx, printed Sep. 22, 2005, 2 pages.

Microsoft Windows$^{xp}$, Auto-Editing and Manual Editing with Windows Movie Maker 2, http://www.microsoft.com/windowsxp/using/moviemaker/getstarted/autoediting.mspx, published Jan. 22, 2003, 3 pages.

Wikipedia, "Windows Movie Maker", http://en.wikipedia.org/wiki/Windows_Movie_Maker, saved printout pp. 1-18 on Feb. 28, 2008.

Microsoft, "Adding Video Effects to Your Movies with Windows Movie Maker 2", Nov. 13, 2003, http://www.microsoft.com/windowsxp/using/moviemaker/learnmore/addingeffects.msp, printout pp. 1-3.

\* cited by examiner

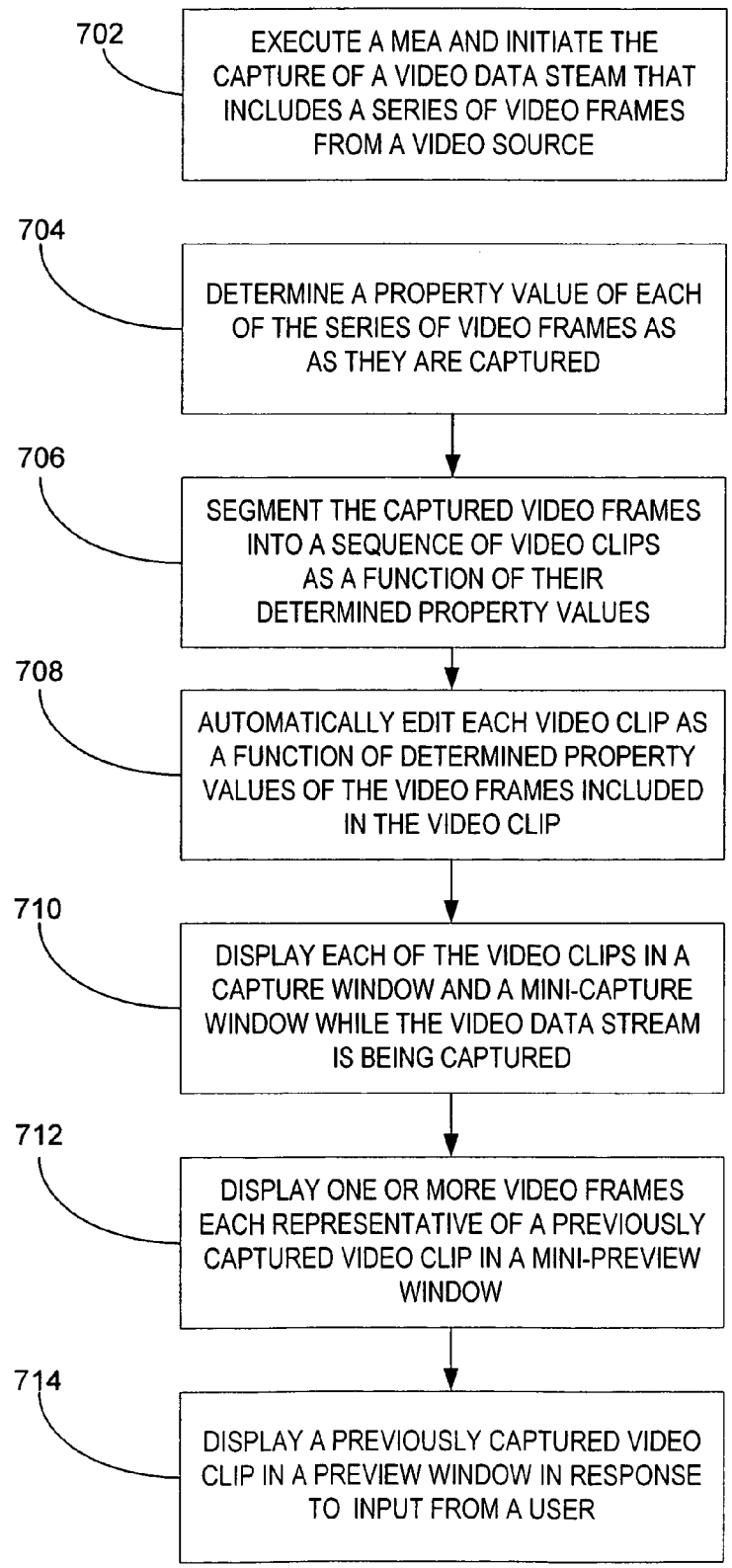

AUTOMATIC CAPTURING AND EDITING OF A VIDEO

BACKGROUND

An increasing number of people own and use digital video recorders to make videos that capture their experiences and document events in their lives. One of the problems with consumer home video acquisition devices such as digital video cameras is that they are linear-based devices and a single recording, either digital or on tape, may contain multiple "events" (e.g. birthday party, soccer game, vacation video). Each event may in turn include multiple "clips" or "shots" (e.g., the sequence of contiguous video frames between the time when the camera is instructed to start recording and when it is instructed to stop recording). Moreover, each shot may consist of one or more scenes. Unfortunately, the linear nature of typical video recordings often makes it difficult to find and playback a segment of the video showing a specific event, scene, or shot.

It is usually more convenient to the user if a long video may be divided into a number of shorter segments and the user is allowed to access those segments directly. Ideally the video should be divided at the points where natural discontinuities occur. Natural discontinuities include discontinuities in time (e.g., gaps in the recorded DV time code) as well as discontinuities in content (e.g., scene changes). If the recording is continuous on a digital video (DV) tape, for example, the time code should increment by a predictable value from frame to frame. If the recording is not continuous (e.g., the user stops the recording then records again later), then there will be a gap in the time stamp that is larger than the normal frame-to-frame increment. Such gaps correspond to discontinuity points in time. Similarly, if there is no sudden motion or lighting change, the video content would remain generally continuous as well. A sudden change in the video content may suggest the occurrence of some event in the video. Such sudden changes would correspond to discontinuity points in content. A time-based or content-based discontinuity point in a video is sometimes referred to as a shot boundary, and the portion of a video between two consecutive shot boundaries is considered to be a shot.

Known video playback, browsing and editing applications, such as multimedia editing applications (MEAs), allow a user to bring versatility to such linear video recordings via a personal computer by allowing the user to capture or transfer the video onto the computer and then to manually segment the digital video file into events of the user's choosing. Some MEAs make this easier for the user by attempting to automatically detect clip boundaries within a particular video file that has been captured. Conventional MEAs use various methods to detect clip boundaries within a particular video. Thereafter, the MEA may segment the video file into clips that are displayed in a library to allow the user to manually select clips and combine them to form recordings of events of the user's choosing. However, as known to those skilled in the art, these applications are unable to achieve the simultaneous capture and editing of videos.

SUMMARY

Aspects of the invention not only detect clips in a video being captured, but also simultaneously display and edit the video during the capturing process. The invention provides a remote user-interface for allowing a user to interact with clips during the capturing process. Accordingly, a personalized home movie may be created using the remote interface during the capture process.

Computer-readable media having computer-executable instructions for segmenting videos embody further aspects of the invention. Alternatively, embodiments of the invention may comprise various other methods and apparatuses.

Other features will be in part apparent and in part pointed out hereinafter.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 7 is an exemplary flow chart illustrating a method for editing one or more video clips in a video data stream being captured.

Corresponding reference characters indicate corresponding parts throughout the drawings.

DETAILED DESCRIPTION

Figure 1:
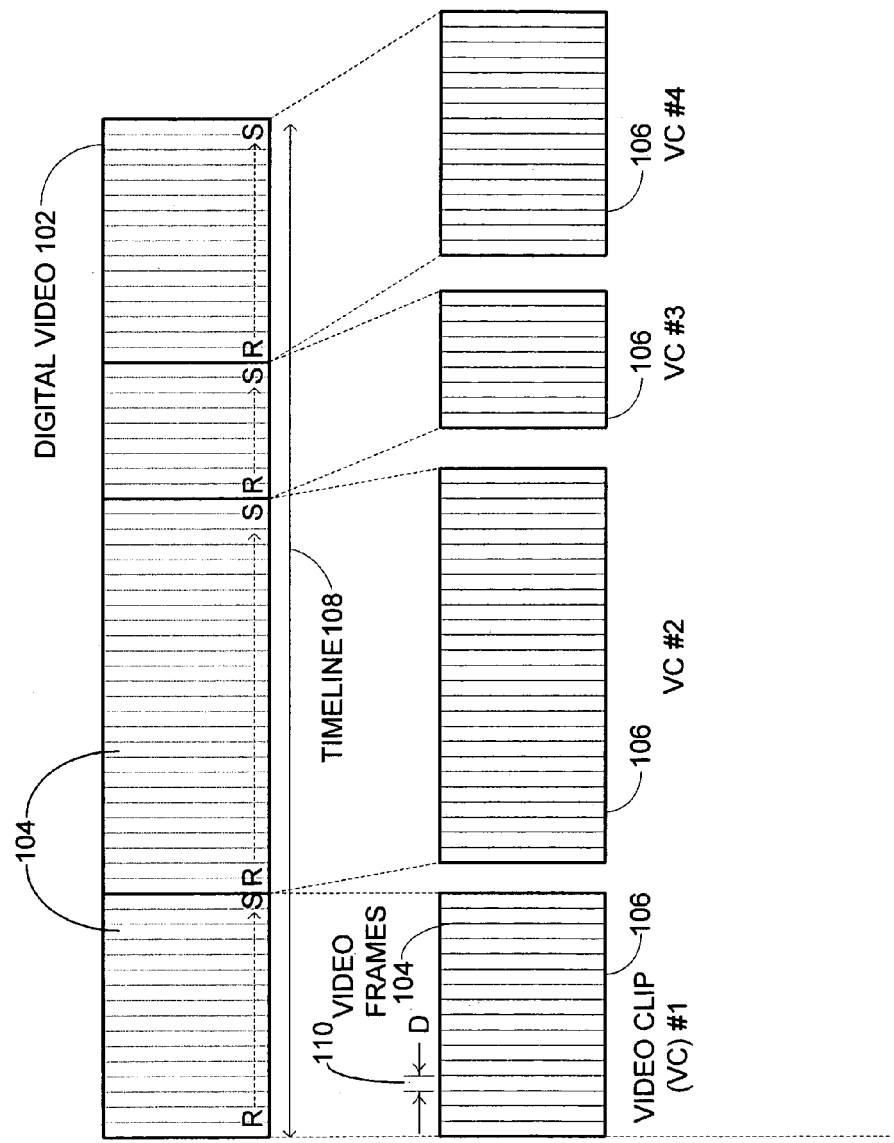
FIG. 1 is an exemplary block diagram illustrating levels of a digital video file.

Referring first to FIG. 1, an exemplary block diagram illustrates three fundamental levels of a digital video file 102 or a digital video. At a fundamental or base level, digital video 102 comprises multiple video frames 108, each video frame 104 typically having a fixed duration D and a known date and time at which the recording began. As known to those skilled in the art, the duration of a video frame 104 is typically a small fraction of one second (e.g., 1/30, 1/25 or 1/24) but may be any other value or may vary from frame to frame within a single video 102.

At the next higher level, digital video 102 comprises multiple video shots, or clips 106 including one or more video frames 104. As shown by timeline 108, each video clip 106 represents a continuously recorded portion of the digital video 102 between a record operation R and a stop operation S of the recording device. Within video clip 106, each subsequent video frame 104 after the first video frame 104 in the shot has a start date and time equal to the start date and time of the previous video frame 104 plus the duration D, as indicated by reference character 110, of the previous video frame 104. As known to those skilled in the art, the difference between the last frame of one shot and the first frame of the next shot is always greater than the duration of a single video frame 104. The time difference may be a few seconds or it may be several minutes, hours or even days or months away, and typically corresponds to the time between the user pressing stop on a video recording device (e.g., camcorder) and the next time the user starts recording.

Figure 2:
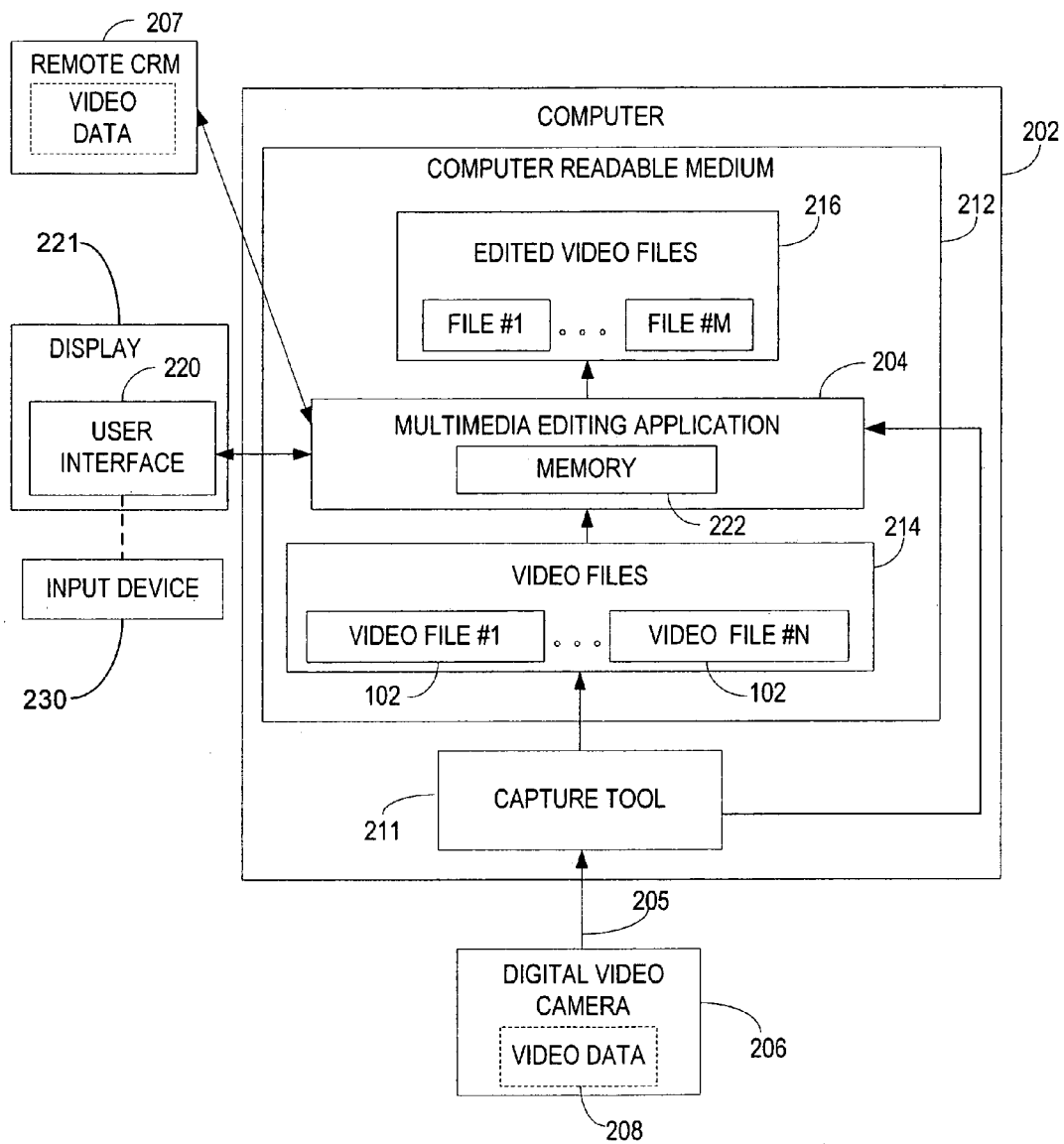
FIG. 2 is a block diagram illustrating one example of a suitable operating environment in which aspects of the invention may be implemented.

Referring now to FIG. 2, an exemplary block diagram illustrates a suitable operating environment in which aspects of the invention may be implemented. A computer 202 comprises a multimedia editing application (MEA) 204 for performing various video editing functions including identifying video clips 106 or segment boundaries between video clips 106 within a digital video data stream (video stream) 205 being captured or transferred from a video source 206. For example, a video source 206 such as a digital video camera provides, via the video data stream 205, digital video data 208 including video clips 106 and/or other media elements (e.g., still shots) to the computer 202 executing the MEA 204. Notably the video data stream 205 may transfer video data from the video source as the video data 208 is recorded (e.g., live feed or streaming video), or may transfer video data from a video file 102 stored on the video source 206. The MEA 204 organizes video frames 104 and video clips 106 and/or other media elements dynamically or statically into an edited video file 216 for the purposes of viewing the video and/or interacting with video via a user interface 220 on a display 221, or for subsequent output onto another CRM (e.g., remote CRM 207) such as a Digital Video (DV) tape linked to the computer 202. For example, the DV tape may be an optical video disc with chapters such as a Digital Video Disk (DVD).

In one embodiment, the digital video camera 206 records a visual image or series of visual images and generates the video stream 205 representative of the visual image or series of visual images. The video stream 205 includes video data 208 specifying the start time and date of the individual video images or "video frames" included in the video stream 205.

The remote CRM 207 may be any CRM storing video data 208 that may be linked to the computer 202 for the purpose of transferring or storing video data 208. For example, the remote CRM 207 may be an optical disc in a DVD-drive, another computer, a personal video recorder (PVR), or any other video-capable device that may be linked to the computer 202 via a network (e.g. Ethernet) or direct connection (e.g. Universal Serial Bus) such that video data 208 stored on the remote CRM 207 may be transferred to the computer 202 or received from the computer 202 via electronic means such as file transfer or electronic mail.

A capture tool 211 is linked to the computer 202 and the digital video camera 206 for capturing the video stream 205. The capture tool 211 transfers the digital data directly to the MEA 204 or directly to the CRM 212 (e.g., hard drive or random access memory (RAM) of the computer 202 for storage as a video file 214 containing, for example, DV data. Alternatively, the capture tool 211 may convert the format of digital video stream 205 from one digital video format to another during capture. For example, the capture tool 211 may convert the format of the video stream 205 from DV data to Windows Media Video (WMV) while preserving the date and time information about each of the series of video frame 104 included in the video data 208. The capture tool 211 may change the timing or the number of frames present within the video stream 205. For example, the capture tool 211 may convert the frame rate of the video steam 205 to a different frame rate while preserving the start time for each new video frame 104 created and calculating a new duration for each video frame 104. The capture tool 211 may be implemented using software that writes DV/Audio Video Interleave (AVI) files together with a direct connection such as an Institute of Electrical and Electronic Engineers (IEEE) 1394 interface. The IEEE-1394 interface may be connected to an IEEE-1394 connection port on a digital camcorder and connected to an IEEE-1394 connection port on the computer 202 to facilitate the transfer of the video stream 205, generated by digital video camera 206, to the computer 202 for storage. Although the capture tool 211 is described as capturing a video stream 205, it is contemplated that audio information (i.e., audio stream) that corresponds to a particular video 102 may also be captured. Thus, as used herein, the discussion relating to video is applicable to both video and audio information.

An MEA 204 allows a user to archive video recordings recorded on video tapes for storage in a digital format. The MEA 204 further allows a user to dynamically or selectively edit the video data 208 during the video stream 205 capturing process. That is, the user is not required to wait until the video stream 205 has been completely captured before editing the video data 208 included in the video stream. Moreover, embodiments of the MEA of the invention allow the user to remotely edit the video 102 during the capturing process. In other words, the user is not required to be located at the computer terminal, but may use a remote control (not shown) to send commands to the computer executing the MEA to initiate the editing process. As a result, the editing and capturing process may be experienced by multiple viewers.

The MEA 204 in the illustrated embodiment provides a user interface (UI) 220 for selectively defining a transition effect to insert between consecutive video clips and/or special effects to apply to one or more video clips during the video capturing process. The UI 220 also provides the user the ability to view video clips as they are being captured, the ability to preview edits made as the video is being captured, and the ability to store and transfer the edited video file after the video capturing process has been completed.

The exemplary operating environment illustrated in FIG. 2 includes a general purpose computing device (e.g., computing device 202) such as a computer executing computer-executable instructions. The computing device typically has at least some form of computer readable media (e.g., computer-readable medium 212). Computer readable media, which include both volatile and nonvolatile media, removable and non-removable media, may be any available medium that may be accessed by the general purpose computing device. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media. The computing device includes or has access to computer storage media in the form of removable and/or non-removable, volatile and/or nonvolatile memory. A user may enter commands and information into the computing device through an input device 230 or user interface selection devices such as a keyboard (e.g., wired or wireless) and a pointing device (e.g., a mouse, trackball, pen, or touch pad). Other input devices (not shown) may be connected to the computing device. The computing device may operate in a networked environment using logical connections to one or more remote computers.

Although described in connection with an exemplary computing system environment, aspects of the invention are operational with numerous other general purpose or special purpose computing system environments or configurations. The computing system environment is not intended to suggest any limitation as to the scope of use or functionality of aspects of the invention. Moreover, the computing system environment should not be interpreted as having any dependency or requirement relating to any one or combination of components illustrated in the exemplary operating environment. Examples of well known computing systems, environments, and/or configurations that may be suitable for use in embodiments of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

Figure 3:
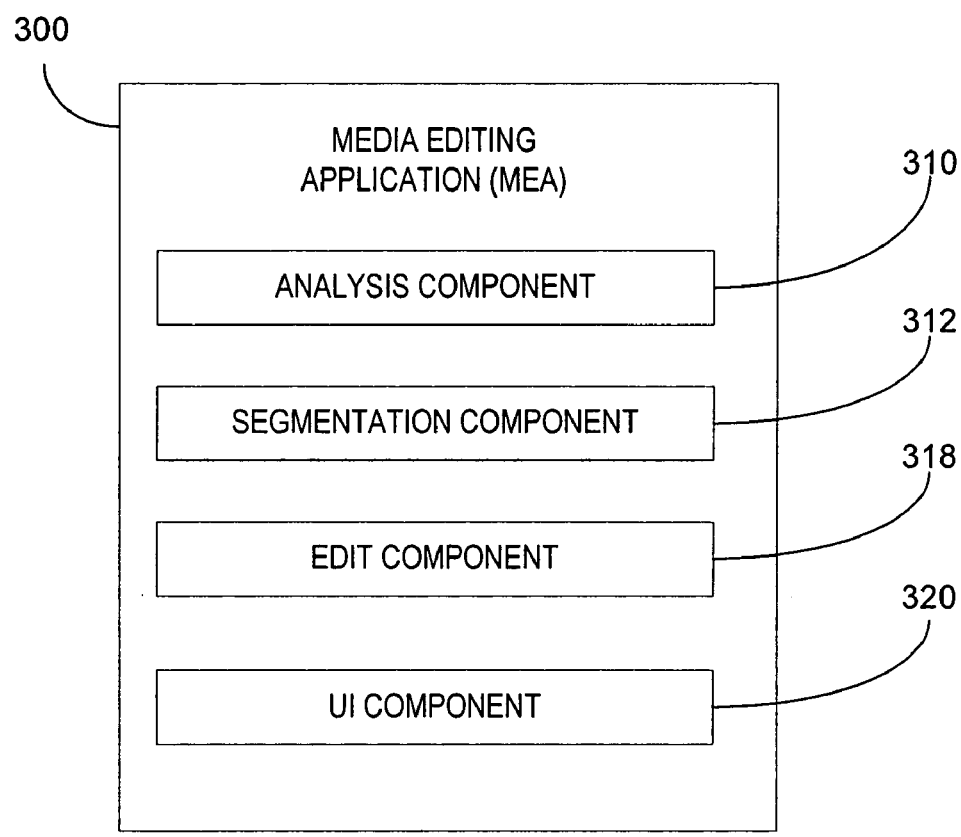
FIG. 3 is an exemplary block diagram illustrating components of an MEA for implementing aspects of the invention.

Referring now to FIG. 3, an exemplary block diagram illustrates basic components of an MEA 300 (e.g., MEA 204) for implementing aspects of the invention. An analysis component 310 analyzes video frames 104 included in the video stream 205 being captured or transferred from a video source (e.g., video camera 206) to determine a property value of each of the video frames 104 and to determine differences between property values of successive video frames 104. For example, the analysis component 310 determines a content property value for each video frame 104 by analyzing the image content of each frame 104 in the video stream 205 using color histograms or other image analysis techniques such as a Hue, Saturation, and Value (HSV) color histogram for each video frame 104 in the window 304. Notably, although aspects of the invention are described herein as determining a content value of a video frame by using HSV color histogram analysis, it is contemplated that other color space histograms such as Red, Green, Blue (RGB) color histogram analysis and Yellow, Ultra and Violet (YUV) color histogram analysis, as well as any other digital signal processing technique may be used. As known to those skilled in the art, color histograms may be used to determine a content value of a digital image. A color histogram of an image represents the distribution of its pixels in the color space. The histogram is a graph showing the number of pixels in an image at each different color value, or bin, in the color space. For example, a HSV color histogram which has been quantized into k bins for H, l bins for S and m bins for V may be represented as $HSV_{klm}$. A color histogram is constructed by counting pixels belonging to each color bin. Notably, determining differences between property values of successive video includes determining differences between property values of one or more video frames 104 in a series of video frames 104. For example, the analysis component 310 determines differences in property values by comparing a determined property value of each video frame 104 in a series of video frames 104 to a determined mean of the series of video frames 104. Alternatively, determining differences between property values of successive video frames 104 may include determining differences between adjacent video frames 104.

Figure 4:
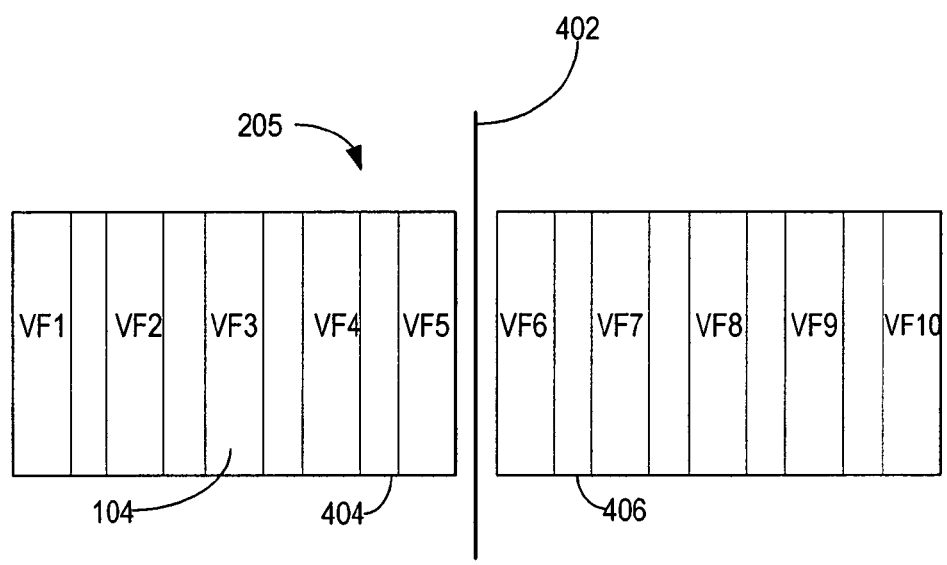
FIG. 4 is an exemplary block diagram illustrating a video data stream having a series of video frames segmented into video clips via a defined segment boundary.

A segmentation component 312 segments the video stream 205 into video clips 106 as a function of the determined differences between property values of successive video frames 104 as the video stream 205 is being captured. For example, the segmentation component 312 compares the distance or difference between the color histograms of adjacent frames 104 to a threshold value and defines a segment boundary between adjacent video frames 104 having a difference greater than the threshold value. The segmentation component 312 is responsive to the defined segment boundary to segment the video stream 205 into video segments, or video clips. For example, referring briefly to FIG. 4, consider that the first ten video frames 104 of a video stream 205 have been captured. Further consider that a segment boundary 402 has been identified between the fifth and sixth frames of the video stream 205. In this example, segmentation component 312 segments the video stream 205 into a video first clip 404 consisting of video frames VF1, VF2, VF3, VF4, and VF5, and a second video clip 406 consisting of, at least, video frames VF6, VF7, VF8, VF9, and VF10.

Referring again to FIG. 3, as another example, the analysis component 310 determines a time property value for each of the video frames 104 in the video stream 205 being captured by analyzing time stamp data included in each video frame 104. In the case of a video 102 recorded by a digital video source, the time and date for each video frame 104 may be transferred as video data in the video stream 205. Accordingly, the start and end times may be easily determined by examining the first and last video frames in the video clip 106 and extracting the time and date information present in the transferred digital data. For still images generated, for example, by a digital still camera (DSC), the date and time that the picture was generated is typically stored in Exchangeable Image File Format (EXIF) metadata present in the Joint Photographic Experts Group (JPEG) file. For the purposes of one embodiment of this invention, the start and end times for a still image are set to the same value. In other words, a still image is treated as a video clip 106 with a duration of zero seconds. For other media elements the time and date an image was created or the time and date it was last modified (depending on the application) is used for both the start and end times.

The segmentation component 312 calculates differences in time property values between successive video frames 104 to define the segment boundary 313. For example, if the time difference between a particular set of successive video frames 104 indicates a break in time, the segmentation component 312 defines a segment boundary between that particular set of video frames 104. There are at least two sets of time property data that can be used to determine if there is a break in time; time codes and time stamps. The time code is contiguous on the tape unless the user removes and reinserts parts of the tape. The time stamp represents when the video was taken. If there is a break in the time stamp or time code, a segment boundary is defined.

Other property value determination techniques including face recognition algorithms, GPS data, audio analysis (loud/ soft, break in background music, music beat detection), accelerometer (physical movement of the recording device), detection of movement within the video may be used to assign property values to video frames 104 in order to distinguish adjacent video clips 106.

An edit component 318 is responsive to the defined segment boundary to apply a default transition effect between the successive video clips 106, separated by the defined segment boundary, while the video stream 205 is being captured from the video source 206. As known to those skilled in the art, a transition effect is added between successive video clips 106 in a video editing process to provide a desired visual transition between consecutive scenes on the video. Examples of such transitions include following: (1) dissolve; (2) side wipe; (3) checker board cut; (4) fade; (6) circle effect; (7) flip (8) wipe; and (9) lines. (See FIG. 5B below). The edit component 318 determines a default transition effect to apply between successive video clips 106 as a function of differences of the property values between the last video frame 104 of one clip and the first video frame 104 of the next video clip, and/or based on transition effect selection rules stored in a memory (e.g., memory 222) of the MEA 300. The following table provides an example of transition selection rules used by the edit component 318 to determine which default transition type to insert between the successive video clips.

TABLE 1

| Two clips | Transition Type | Transition Effect to Apply | Description |
| --- | --- | --- | --- |
| Short period of time | Soft transition | Dissolve | Two scenes shot in the same room that occur within a brief period of time. (e.g., <5 minutes) |
| Similar time periods | Medium transition | Wipe | Two scenes shot at the same event, but occur at slightly longer periods of time or shot in different rooms/lighting conditions. (e.g., 5–59 minutes |
| Different time periods | Complex transition | Fade to color | Two scenes shot at two different times that clearly reflect two different events. These would be candidates for chapter points. (e.g., >60 minutes |

For example, consider that the MEA 300 has captured first and second successive clips of a video. The first clip has an end time, as determined from time data included in the last video frame 104 of the first clip, and the second clip has a start time, as determined from time data included in the first video frame 104 of the second clip. If the difference between the end time of the first clip and the start time of the second clip is less than a predetermined time period (e.g., less than 5 minutes), a soft transition type such as a dissolve effect is applied between the first and second clip. As another example, if content property values of video frames included in the first and second clips, as determined by color histogram analysis, indicates the video clips were recorded in locations having substantially different backgrounds, a more complex transition type such as "fade to color" is applied between the first and second clips.

The edit component 318 is further responsive to the defined segment boundary to apply a default special effect to each video clip while the video data stream is being captured from the video source. According to aspects of the invention, the edit component 318 determine a default special effect to apply to a particular video clip as a function of the determined the property values of the video frames included in that particular video clip and/or based on special effect selection rules stored in a memory. For example, a pan and zoom effect may be automatically added to still images, flash and board effects may be automatically added to very short video clips, and a picture-in-picture effect may be automatically applied to clips that overlap in time.

A user interface (UI) component 320 allows the user to view and/or edit video clips 106 while the video stream 205 is being captured. More specifically, the UI component 320 displays a graphical user interface to the user via a display (e.g., display 221) that allows the user to view video clips 106, selectively edit video clips, and preview any edits made to video clips while the video stream is being captured from the video source 206.

Figure 5A:
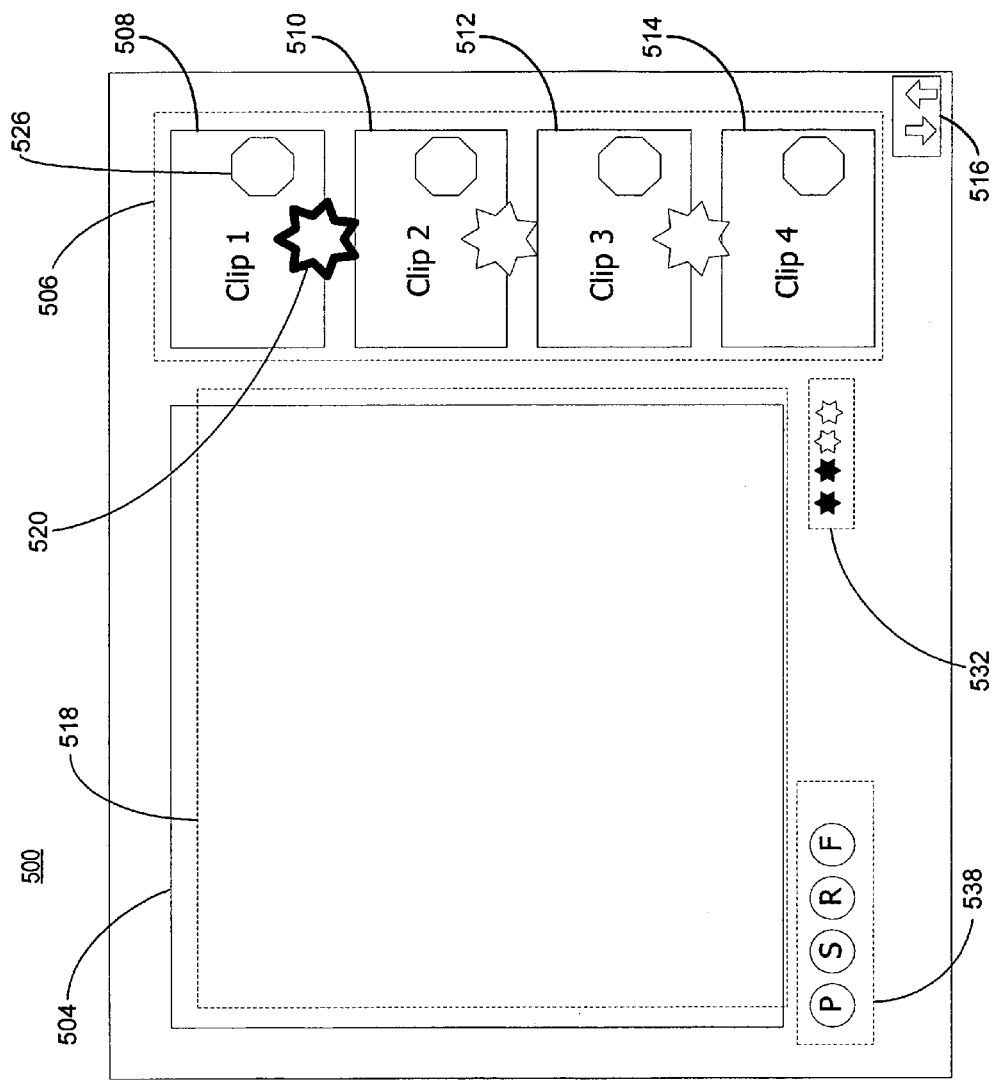
FIG. 5A is a block diagram illustrating an exemplary graphical user interface for displaying and editing video clips.

Referring now to FIG. 5A, there is shown an exemplary graphical UI 500 according to one aspect of the invention. The UI 500 includes a capture window 504 for viewing video while the video stream 205 is being captured from the video source 206. Notably, although a few video frames 104 (e.g., 2-3 video clips are captured before playback of the video initiates), the invention allows substantially simultaneous playback and capture of the video. That is, each of the series of video frames included in the video data stream 205 being captured are displayed to the user via the UI 500 at substantially the same time they are being captured, or received, from the video source 206. The UI 500 includes a clip queue window (clip queue) 506 containing a miniaturized capture window (mini-capture window) 508 and one or more mini-preview windows (e.g., 510, 512, and 514) to allow the user to track video clips as they are detected and view any transitions and/or special effects applied by the edit component 318. The mini-capture window 508 displays the same video clip 106 currently being played in the capture window 504, but is substantially reduced in size as compared to the capture window 504. The term "miniaturized or "mini" is used herein to convey that a "mini-window" is a window that is substantially reduced in sized as compared to other non-miniaturized windows or windows. In other words, when a particular video clip 106 is being captured, it is simultaneously played in both the larger capture window 504 and in the smaller mini-capture window 508 in the clip queue 506. The mini-preview windows 510, 512, 514 display thumbnails representative of video clips 106 previously identified during the capturing process, and are arranged in the clip queue 506 such that the last captured video clip 106 corresponds to the mini-preview windows 510 and the first captured video clip 106 corresponds to the mini-preview windows 514. In this particular UI configuration, if four or more video clips 106 have been captured, the mini-capture window 508 displays the video clip 106 currently being captured, and the mini-preview windows 510, 512, 514 correspond to the last three captured clips. A scroll bar control 516 allows the user to display any other mini-preview windows that correspond to the any remaining captured video clips. For example, the scroll bar control 516 includes up and down arrows that a user selects using, for example, a mouse, keyboard controls, or a hand held remote control to scroll up or down to view other mini-preview windows that correspond to previously captured video clips. Each of the mini-preview windows 510, 512, 514 may display a single video frame or image representative of the corresponding captured video (e.g., thumbnail), or in response to user input (e.g., double mouse click on mini-preview windows) play the video of the corresponding captured clip. The mini-capture window 508 may also display a single frame representative of the corresponding captured video after the capturing process is complete, and prior to the capturing process beginning for the next video clip 106. The UI 500 is responsive to a user selecting a mini-preview windows (e.g., 510, 512, or 514) to present a larger preview window 518 for viewing the corresponding previously captured video clip 106. Notably, using standard navigation techniques, the user may alternate between viewing the capture and preview windows 504, 518, respectively, or may arrange the capture and preview window 504, 518 in a tiled format to view both simultaneously.

Figure 5B:
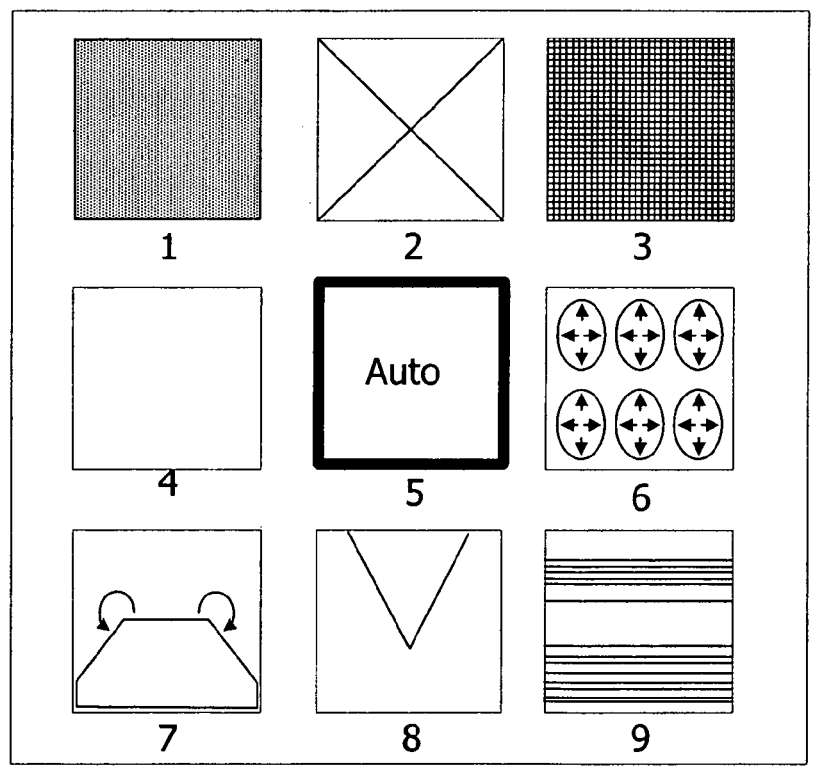
FIGS. 5B and 5C are exemplary screen shots of transition effect menus.

The UI includes one or more transition controls 520 for adding a transition effect (transition) or replacing an existing transition (e.g., overriding a default transition) between video clips. In this particular embodiment, a transition control 520 is located between each of the miniaturized windows (e.g., 508, 510, 512, and 514) displayed in the clip queue window 506. By selecting a transition control 520 between a particular set of miniaturized windows (e.g., 508, 510, 512, and 514), a transition selection menu displaying various transition effects that may be applied between the corresponding video clips is presented to the user via the UI 500. For example, if the user selects the transition control 520 between the mini-capture window 508 and the mini-preview window 510, a first transition menu 522 such as shown in the screen shot illustrated in FIG. 5B is displayed to the user. In this example, the transition menu 552 displays nine (9) different transition types from which the user may select a transition to insert between the two video clips 106 corresponding to mini-windows 508, 510: (1) dissolve; (2) side wipe; (3) checkerboard; (4) fade; (5) Auto select (i.e., default); (6) circle; (7) flip; (8) wipe; and (9) lines. The user uses direction arrows or numeric keys on an input device (e.g., keyboard or remote control device) configured for communicating with the computer to highlight a particular transition displayed on in the transition menu 522. For example, the user selects the checkerboard transition by using arrow keys to navigate thru the transition menu 522 until the checkerboard transition is highlighted or the user presses the number 3 which corresponds to the checkerboard. Pressing an OK or Enter key on the input device selects the current transition and the removes the transition menu 522.

Figure 5C:
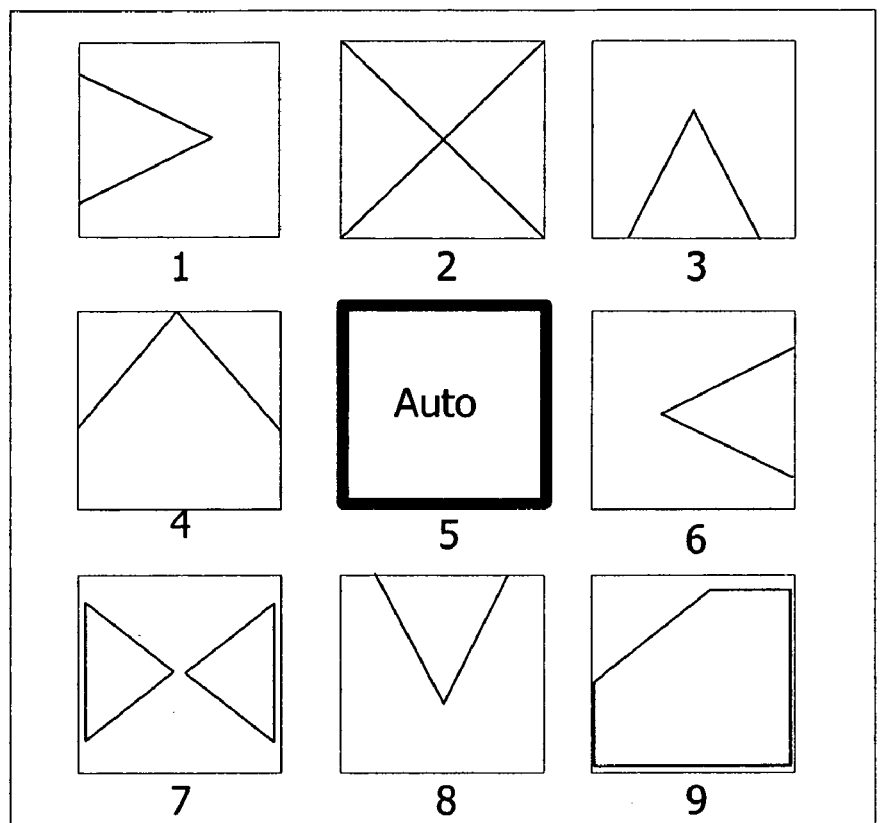

Alternatively, a second transition menu 524 such as shown in the screen shot illustrated in FIG. 5C may be viewed by again entering or pressing the same number as a highlighted transition. The second transition menu 524 displays additional transitions corresponding to the highlighted transition on the first transition menu. For example, if the user uses the input device to enter the number seven (7) to highlight the wipe transition displayed in the first transition menu 522 and again presses the number seven (7), additional wipe transitions will be displayed in the second transition menu 524. Navigation keys (e.g., arrow keys) on the input device may used to view transitions other than the nine (9) transitions shown in the first transition menu 522. For example, if transition number eight (8) was highlighted and the user presses the down arrow, the second transition menu 524 showing additional wipe transitions would be shown. Notably, the displayed transitions are fully animated and are shown using the captured video to show the user the final transition incorporated into the actual video. That is, instead of the graphical representation shown in the diagrams, the actual video is shown.

Figure 5D:
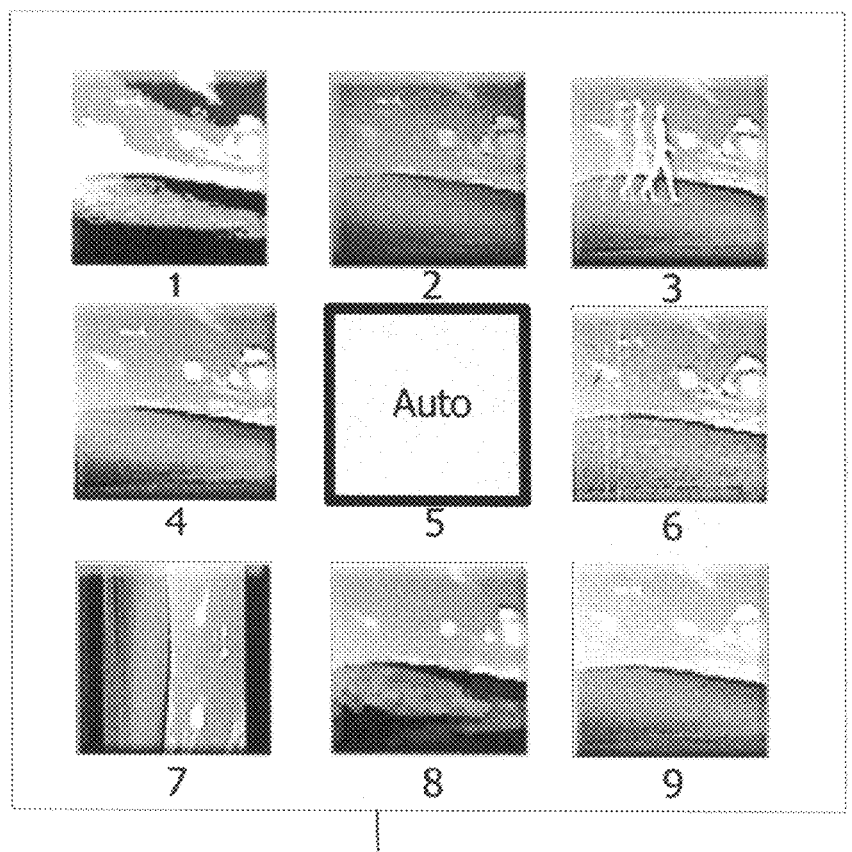
FIGS. 5D and 5E are exemplary screen shots of special effect menus.
Figure 5E:
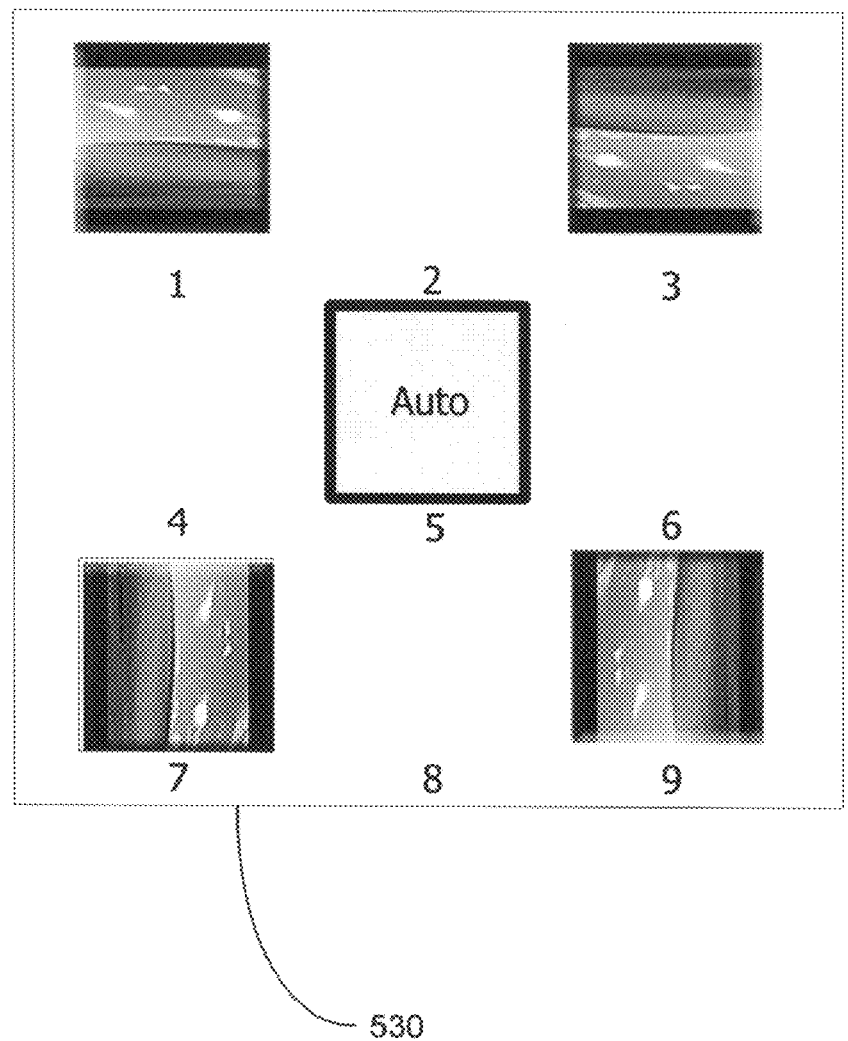

Referring back to FIG. 5A, the UI 500 includes a special effects control 526 for applying special effects to a video clip or replacing existing special effects applied to the video clip (e.g., default special effect). According to one aspect of the invention, a special effects control 526 is located on each of the mini windows (e.g., 508, 510, 512, and 514) displayed in the clip queue window 506. When a user selects a special effects control 526 located on a particular miniature window (e.g., 508, 510, 512, and 514), a special effects menu displaying the various types of special effects that may be applied to the corresponding video clip is presented to the user via the UI 500. For example, if the user selects the special effects control 526 located on the mini-preview window 510, a first special effects menu 528 such as shown in the screen shot illustrated in FIG. 5D is displayed to the user. In this example, the special effects menu 528 displays nine (9) special effect types from which the user may select a special effect to apply to the video clip 106 corresponding to the mini-preview window 510: (1) threshold; (2) fade out; (3) speed up; (4) grayscale; (5) Auto select (i.e., default); (6) film; (7) rotate; (8) watercolor; and (9) sepia tone. Moreover a second special effects window 530 such as shown in the screen shot illustrated in FIG. 5E that displays additional special effects may be displayed by using the various navigation techniques described above in reference to FIG. 5B. The special effects control 526 is also displayed on the preview window 518.

The UI 500 displays a rating field 532 for displaying rating data that has been assigned to the video clip 106 by the analysis component 310. The rating field 532 displays rating data for the particular video clip 106 being played in the capture window 504. Alternatively, if the user has selected a particular mini-preview window (e.g., 510, 512, and 514) from the clip queue 506 window, the rating field 532 displays rating data for that particular video clip 106. According to one aspect of the invention, the analysis component 310 is responsive to content included in video clips 106 being captured to assign a rating to each captured video clip 106. The rating data is presented via a rating scale that displays between one to four stars. One star corresponds to the lowest rating and four stars correspond to the highest rating. For example, the analysis component 310 determines a rating for each video clip 106 being captured as a function of the quality of video frames 104 included in each of the captured video clips, whether faces are detected in the video clips, or the speed at which the video clip was originally recorded. The analysis component 310 determines the quality of the video by determining whether the video frames 104 included in the video clip are dark or blurry. Video clips identified as dark or blurry are assigned a low rating (e.g. one star). The analysis component 310 determines if faces are included in video clips by using face detection techniques such as described in commonly owned U.S. patent application Ser. No. 10/850,883 to Blake et al. If faces are detected in the video clip a higher rating (e.g. 2.5 stars rating) is assigned to the video clip. The analysis component 310 uses motion vector analysis to analyze each video clip to identify clips that have motion above or below a certain threshold (e.g., slow motion). If slow motion is detected within a video clip, a high rating (e.g. 4 stars) is assigned to the video clip. According to one aspect of invention, the edit component 318 is responsive to the rating assigned by the analysis component 310 to deletes clips from the video having an assigned rating less than or equal to a threshold rating. For example, video clips 106 that have been assigned a rating less than 2 stars are deleted from the video. A user may override the assigned ratings by selecting the clip window from the clip queue and adjusting a star rating property. More specifically, when the clip is previewed in the main window 518, the clips star rating is displayed. Pressing the keys 1-4 or navigating to and selecting the star will adjust the clips star rating. If the user makes changes to the star rating, the auto movie is instantly updated and the current clip is replayed.

A playback control 538 controls the playback of a video clip. More specifically, the playback control 538 allows a user to stop (S), play/pause (P), rewind (R), or fast forward (F) a video clip 106 being played in the capture window 504, or being played in an active preview window 518.

Figure 6:
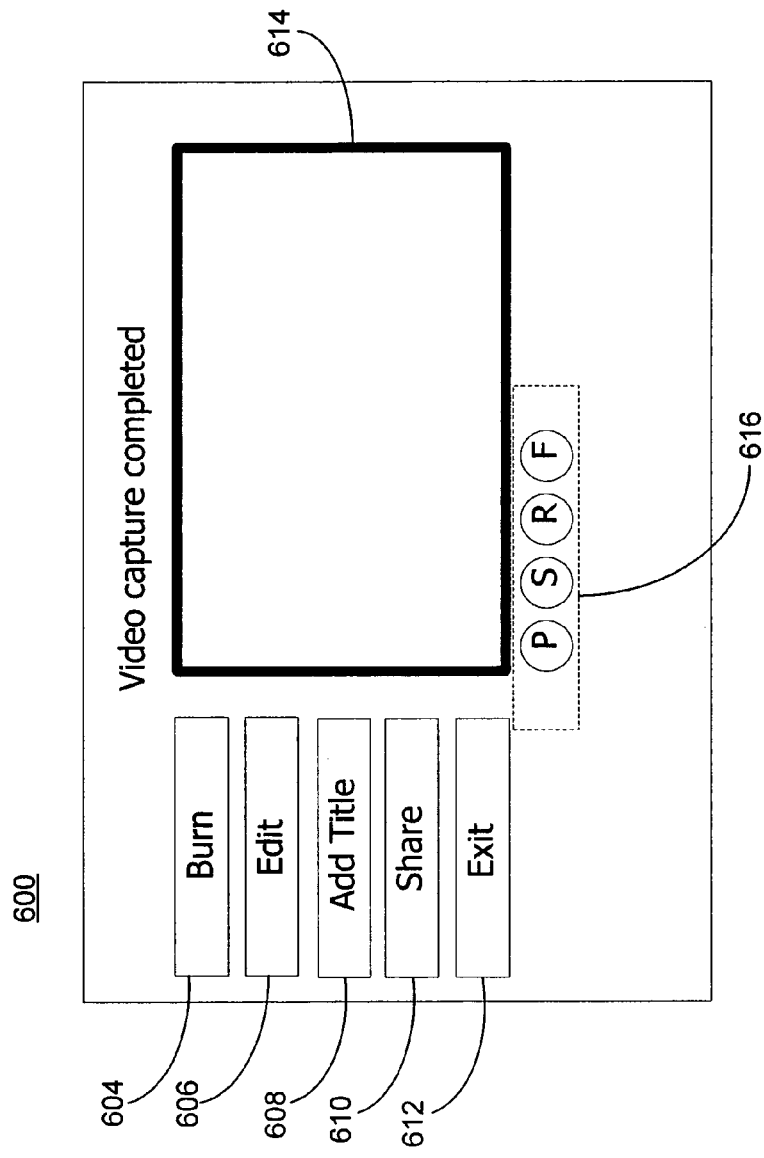
FIG. 6 is a block diagram illustrating an exemplary graphical user interface for storing and/or transferring a captured video.

After the video capturing process has completed, the UI component 314 displays a different graphical user interface to allow the user to burn the captured video to a DVD, edit the video, add a title, or share the video. Referring now to FIG. 6, there is shown an exemplary graphical UI 600 according to one aspect of the invention. A burn control 604 is responsive to user input to burn a captured video file including the detected video clips and any added transition or special effects applied between video clips or to the video clips, respectively, to a DVD. An edit control 606 is responsive to user input for displaying the first UI 500 to allow the user to view individual video clips, add transition and/or special effects to the video, or replace existing transition and special effects applied to the video. A title control 608 is responsive to user input for allowing a user to a title to the captured video. A share control 610 is responsive to user input for allowing a user to transfer the captured video to a remote computer. For example, the share control configures the video for transmission via electronic-mail or other sharing methods like peer-to-peer. An exit control 612 allows the user to close the second UI 600 and/or exit the MEA. The UI 600 also includes a playback window 614 for playing the captured video file, and a playback control 616 for controlling the playback of the video file in the playback window 614.

Referring now to FIG. 7, an exemplary flow chart illustrates a method for editing one or more video clips in a video stream being captured via multimedia editing application (MEA) such as describe above in referenced to FIG. 3. A user connects a video source to a computer executing a MEA 300 to initiate the capture of a video data stream from the video source at 702. At 704, the MEA 300 determines a property value (e.g., content property value, time property value) of each of a series of video frames included in the video data stream as each particular video frame is captured by the MEA 300. The MEA 300 segments the captured video frames into a sequence of video clips as a function of the determined property values of each the captured video frames at 706. At 708, the MEA 300 edits each video clip as a function of the determined property values of each of the video frames included in each video clip. For example, the MEA 300 edits video clips by applying a transition effect between successive video clips as a function of the determined differences of the property values between the successive video frames. As another example, the MEA 300 applies a special effect to each video clip as a function of the determined the property values of the video frames included in each video clip. The MEA 300 displays each of the video clips in a capturing window and a mini-capturing window at substantially the same time as each of the series of video frames included in the video clip are being captured from the video source at 710. At 712, the MEA 300 displays one or more video frames, each representative of a previously captured video clips, in one or more mini-preview windows. The MEA 300 is responsive to a user selecting one of the one or more mini-preview windows to display the corresponding previously captured video clip in a preview window at 714.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products and methods without departing from the scope of embodiments of the invention, it is intended that all matter contained in the above description and shown in the accompanying drawings shall be interpreted as illustrative and not in a limiting sense.

What is claimed is:

1. One or more computer-readable storage media having computer executable components executed by a computing device for editing a video data stream, said video data stream having a sequenced plurality of video frames and being transferred from a video source, said computer-readable storage media comprising:

an analysis component for determining a property value of each of the video frames in the video data stream and determining differences of the property values between successive video frames in the video data stream, wherein the property value of each said video frame is determined by at least one of a time stamp, a face recognition algorithm analysis, a GPS data, and an audio analysis of each said video frame;

a segmentation component for segmenting the video data stream into sequenced video clips as a function of determined differences of the property values between successive video frames, said segmentation component segmenting the video data stream while the video data stream is being transferred from the video source, wherein the analysis component determines a property rating for each of the sequenced video clips in the video data stream, wherein the property rating comprises at least three different values, and wherein the analysis component assigns one of the property rating values to each video clip based on each of the determined property values of each of the video frames included in each video clip;

an edit component for applying a default special effect to at least one video clip of the sequenced video clips as a function of the determined property values of the video frames included in the at least one video clip and based on transition selection rules stored in a memory, wherein said special effect is applied to the video clip while the video data stream is being transferred from the video source; and a user interface (UI) component for displaying each of the sequenced video clips while the video data stream is being transferred from the video source, wherein the UI component includes a clip queue window comprising a first miniaturized window for displaying a current video clip being transferred to the computer from the video source, and at least two second miniaturized windows each representative of a video clip previously transferred, wherein each of the second miniaturized windows displays a thumbnail representative of a previously transferred video clip, and wherein said UI component comprises a transition control located between each of the at least two second miniaturized windows for allowing a user to select a desired transition effect from a plurality of transition effects to apply between a selected set of successive video clips, whereby the transition effect is applied between two successive video clips whereas the special effect is applied to the at least one of the video clips, wherein the selected set of successive video clips are the video clips represented by the second miniaturized windows between which the transition control is located, wherein the UI component displays each of the sequenced video clips with the transition effect applied between successive video clips while the video data stream is being transferred from the video source and wherein the UI component includes a video clip property rating field for displaying the value of the property rating assigned by the segmentation component of the video clip being displayed.

2. The computer-readable storage media of claim 1, wherein the UI component displays each of the video frames included in the sequenced video clips substantially simultaneously with the transfer of each of the plurality video frames included in the video data stream from the video source and wherein the UI component includes a property rating control for allowing a user to define a value to the property rating for a selected video clip to override the value of the property rating assigned by the analysis component, and wherein the video clip property rating field displays the user defined value of the property rating for the video clip being displayed.

3. The computer-readable storage media of claim 1, wherein the UI component displays each of the sequenced video clips in a first window, and wherein the UI component is responsive to a user selecting one of the second miniaturized windows to play the video clip corresponding to the selected second miniaturized window in a second window.

4. The computer-readable storage media of claim 1, wherein applying a transition effect between successive video clips includes applying one or more of the following a dissolve effect, a side wipe effect, a checkerboard effect, a fade effect, a circle effect, a wipe effect, and a line effect.

5. The computer-readable storage media of claim 1 wherein the edit component is responsive to the desired transition effect selected by the user to replace the default transition effect applied between the selected set of successive video clips with the desired transition effect.

6. The computer-readable storage media of claim 1, wherein the edit component further applies a default special effect to each video clip in the sequenced video clips as a function of the determined the property values of the video frames included in each video clip and based on the transition selection rules stored in the memory, and wherein said special effect is applied to each video clip while the video data stream is being transferred from the video source, and wherein the UI component displays the special effect applied to each video clip while the video data stream is being transferred from the video source, wherein the UI component includes a special effect control for allowing a user to select a desired special effect to apply to a selected video clip, and wherein the edit component is responsive to the desired special effect selected by the user to replace the default special effect applied to the selected video clip with the desired special effect and wherein applying a special effect to the selected video clip includes applying one or more of the following a threshold effect, a fade out effect, a speed up effect, a grayscale effect, a film effect, a rotate effect, a water color effect, and a sepia tone effect.

7. A computerized method for editing a video data stream being captured from a video source, said video data stream including a sequenced plurality of video frames, said computerized method comprising:
 determining a property value of each of the video frames in the video data stream and determining differences of the property values between successive video frames in the video data stream, wherein the property value of each said video frame is determined by at least one of a time stamp, a face recognition algorithm analysis, a GPS data, and an audio analysis of each said video frame;
 segmenting the video data stream into sequenced video clips as a function of determined differences of the property values between successive video frames, said segmenting further comprising segmenting the video data stream while the video data stream is being transferred from the video source, wherein the determining determines a property rating for each of the sequenced video clips in the video data stream, wherein the property rating comprises at least three different values, and further comprising assigning one of the property rating values to each video clip based on each of the determined property values of each of the video frames included in each video clip;
 applying a default special effect to at least one video clip of the sequenced video clips as a function of the determined property values of the video frames included in the at least one video clip and based on transition selection rules stored in a memory, wherein said special effect is applied to the video clip while the video data stream is being transferred from the video source; and
 displaying a user interface (UI) for displaying each of the sequenced video clips while the video data stream is being transferred from the video source, wherein the UI includes a clip queue window comprising a first miniaturized window for displaying a current video clip being transferred to the computer from the video source, and at least two second miniaturized windows each representative of a video clip previously transferred, wherein each of the second miniaturized windows displays a thumbnail representative of a previously transferred video clip, and wherein said UI comprises a transition control located between each of the at least two second miniaturized windows for allowing a user to select a desired transition effect from a plurality of transition effects to apply between a selected set of successive video clips, whereby the transition effect is applied between two successive video clips whereas the special effect is applied to the at least one of the video clips, wherein the selected set of successive video clips are the video clips represented by the second miniaturized windows between which the transition control is located, wherein the UI displays each of the sequenced video clips with the transition effect applied between successive video clips while the video data stream is being transferred from the video source and wherein the UI includes a video clip property rating field for displaying the value of the property rating of the video clip being displayed.

8. The computerized method of claim 7, wherein determining a property value includes determining a content property value for each of the video frames by analyzing image content of each video frame in the video data stream using a color histogram, and wherein the segmenting includes comparing the distance or difference between the color histograms of adjacent video frames to a threshold value and defining a segment boundary between adjacent video frames having a difference greater than the threshold value, wherein said segment boundary segments one video clip from a next video clip.

9. The computerized method of claim 7, wherein determining a property value includes determining a time property value for each of the video frames in the video data stream being captured by analyzing time stamp data included in each video frame, and wherein the segmenting includes comparing the difference between time data included in successive video frames to a threshold value and defining a segment boundary between successive video frames having a difference greater than the threshold, wherein said segment boundary segments one video clip from a next video clip.

10. The computerized method of claim 7 further comprising:

applying a special effect to each video clip in the sequenced video clips as a function of the determined the property values of the video frames included in each video clip and based on transition selection rules stored in a memory, and wherein said special effect is applied to each video clip while the video data stream is being captured from the video source; and selectively applying a special effect to a selected video clip in response to user input.

11. The computerized method of claim 7 further including:

displaying a current video clip being captured from the video source in a miniaturized capture window; and displaying a previously captured video clip in a preview window in responsive to a user selecting one of the one or more thumbnails.

12. The computerized method of claim 7 further comprising storing a video file on a computer readable medium including at least two of the series of video clips with user selected transitions effects applied between the at least two of the series of video clips.

13. The computer readable storage media of claim 1 wherein the property value of each said video frame as determined by said analysis component is determined by the time stamp, the face recognition algorithm analysis, the GPS data, and the audio analysis of each said video frame.

14. The computer readable storage media of claim 1 wherein the property value of each said video frame as determined by said analysis component is determined by the time stamp of each said video frame.

15. The computer readable storage media of claim 1 wherein the property value of each said video frame as determined by said analysis component is determined by the face recognition algorithm analysis applied to each said video frame.

16. The computer readable storage media of claim 1 wherein the property value of each said video frame as determined by said analysis component is determined by the GPS data of each said video frame.

17. The computer readable storage media of claim 1 wherein the property value of each said video frame as determined by said analysis component is determined by the audio analysis of each said video frame.

* * * * *